United States Patent [19]

Kourtides et al.

[11] 4,193,829

[45] Mar. 18, 1980

[54] PROCESS FOR THE MANUFACTURE OF LOW DENSITY BIS-MALEIMIDE-CARBON MICROBALLOON COMPOSITES

[75] Inventors: Demetrius A. Kourtides, San Jose; John A. Parker, Los Altos, both of Calif.

[73] Assignee: The United States of America as represented by the Administrator of the National Aeronautics and Space Administration, Washington, D.C.

[21] Appl. No.: 920,878

[22] Filed: Jun. 30, 1978

Related U.S. Application Data

[62] Division of Ser. No. 778,195, Mar. 16, 1977, Pat. No. 4,135,019.

[51] Int. Cl.² .............................................. B32B 3/12
[52] U.S. Cl. ................................ 156/276; 156/285; 156/311; 428/117; 428/402; 428/408
[58] Field of Search .............. 156/197, 276, 285, 331; 52/806, 809; 428/73, 375, 458, 473.5, 116–120, 402–408

[56] References Cited

U.S. PATENT DOCUMENTS

| | | | |
|---|---|---|---|
| 3,030,215 | 4/1962 | Veatch et al. | 428/406 X |
| 3,475,262 | 10/1969 | Sargent et al. | 428/117 |
| 3,505,168 | 4/1970 | Dunphy et al. | 428/349 X |
| 3,518,219 | 6/1970 | Lavin et al. | 428/285 X |
| 3,562,223 | 2/1971 | Bargain et al. | 428/458 X |
| 3,575,756 | 4/1971 | Maus | 428/116 X |
| 3,759,779 | 9/1973 | Dumas | 156/331 |
| 3,811,997 | 5/1974 | Yuan | 428/116 |
| 4,061,812 | 12/1977 | Gilwee, Jr. et al. | 428/73 X |

*Primary Examiner*—Henry F. Epstein
*Attorney, Agent, or Firm*—Armand McMillan; John R. Manning; Darrell G. Brekke

[57] ABSTRACT

A process for the preparation of composite laminate structures of glass cloth preimpregnated with polybismaleimide resin and adhered to a polybismaleimide-glass or aromatic polyamide paper honeycomb cell structure filled or partially filled with a syntactic foam consisting of a mixture of bismaleimide resin and carbon microballoons.

The carbon microballoons are prepared by pyrolyzing phenolic microballoons and subsequently bonded using a 2% bismaleimide solution. The laminate structures are cured for two hours at 477° K. and are adhered to the honeycomb bismaleimide adhesive using a pressure of 700 kN/m² pressure at 450° K. The laminate composite is then post-cured for two hours at 527° K. to produce a composite laminate having a density in the range from about 95 kilograms per cubic meter to 130 kilograms per cubic meter.

14 Claims, No Drawings

PROCESS FOR THE MANUFACTURE OF LOW DENSITY BIS-MALEIMIDE-CARBON MICROBALLOON COMPOSITES

The invention described herein was made by employees of the U.S. Government and may be manufactured and used by or for the Government for governmental purposes without the payment of any royalties thereon or therefor.

This is a division of application Ser. No. 778,195 now U.S. Pat. No. 4,135,019 filed Mar. 16, 1977.

BACKGROUND OF THE INVENTION

1. Field of the Invention

The present invention relates to a process for the preparation of low density composite laminate structures consisting of a bismaleimide-glass laminate face sheets adhered to a bismaleimide honeycomb structure containing carbon microballoons bonded with bismaleimide resin. Panels and structures prepared in accordance with the present invention are useful as aircraft panels and panels for vessels which require high ignition temperature and minimum of gassing and evolution of noxious and toxic fumes upon ignition.

2. Description of the Prior Art

Panels and structures employed by manufacturers as the interior paneling of aircraft and vessels subject to confined or constricted environments have generally employed glass-epoxy resins combined with a polyamide core. The prior art structures due to the presence of epoxy exhibit large smoke evolutions and a low fire containment capacity when subjected to heat or flame.

In general the panels and aircraft lining structures have been prepared by silk screening the required decorative surface on a 0.005 cm polyvinyl fluoride film (Tedlar) by a continuous web process. After drying, a 0.0025 cm transparent polyvinyl fluoride film coated on one side with polymethyl methacrylate is bonded to the decorative film to provide protection for the printed surface.

The laminate is then bonded to one ply of epoxy-preimpregnated 181E glass, and may have a surface texture imposed during the bonding operation.

One core material presently employed for sandwich paneling is an aromatic polyamide (sold under the tradename Nomex HRH-10) hexagonal-cell honeycomb structure. The cell size may be 0.312 cm, 0.625 cm, or 0.937 cm, depending upon the properties desired in the finished panel.

The prior art method of binding an outer panel to the core consists of using an epoxy resin-preimpregnated bond ply over which is applied the prepared glass-/polyvinyl fluoride decorative laminate. The resin in the bond ply provides the adhesive to bond the outer panel to the honeycomb and the decorative laminate to the bond ply. Curing is accomplished at 110° C. with 50 cm Hg minimum vacuum bag pressure. For a panel requiring a decorative laminate on one side only, a bond ply is used as the outer panel on the other or back side.

Structures and panels prepared in accordance with the prior art have exhibited relatively lower fire containment capabilities because of the absence of insulative material in the honeycomb core. The prior art structures also evolve large quantities of smoke and toxic fumes when exposed to fire or heat due to the presence of the epoxy material and the glass-epoxy resinous substrate.

DESCRIPTION OF THE INVENTION

SUMMARY OF THE INVENTION

The disadvantages and limitations of the prior art are obviated by the process and material compositions of the present invention which employ a low density bis-maleimide-carbon microballoon composite. The advantages of the invention are achieved by structures composed of a face sheet preimpregnated with bismaleimide resin bound with a polyimide film adhesive to a core containing carbon microballoons bound in a honeycomb core with bismaleimide resin.

Structures prepared in accordance with the present invention possess excellent thermophysical properties. Their rather low thermal conductivity renders them attractive for use as insulation where high temperatures are involved. Also of interest in these situations are the lower oxygen index values that these structures possess which render them more difficult to ignite than the materials of the art. Furthermore, when exposed to heat and flame, the structures of this invention exhibit a marked reduction in the density of smoke produced and in the toxicity of pyrolytic products, two characteristics which greatly improve the chances of survival of people in confined spaces. Such improved properties, coupled with increased mechanical capacities, highly recommend the new structures for use in ground vehicle and aircraft interiors.

DETAILED DESCRIPTION

The resins that are employed in the construction of the structures of the invention are those prepared by the polymerization of various bismaleimides, alone or in the presence of diamino compounds. These monomers and prepolymers can be illustrated by the following formulas:

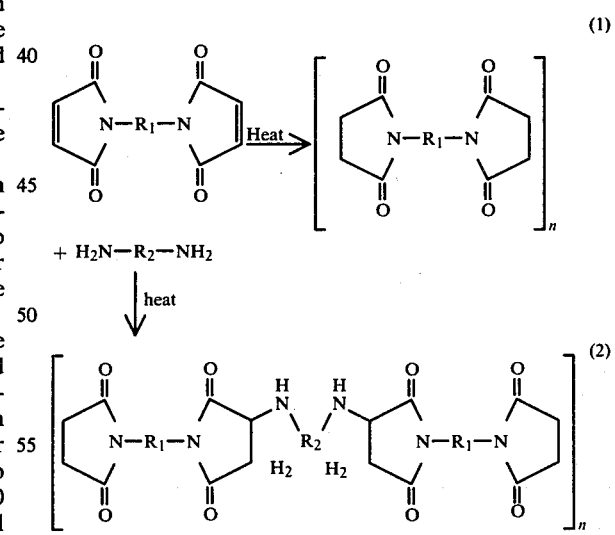

wherein n may be any integer that yields a prepolymer of suitable viscosity under the conditions of use, $R_1$ is a divalent radical having at least two carbon atoms, and $R_2$ represents a divalent radical not having more than 30 carbon atoms. When a diamine is used, the bismaleimide-diamine ratio should be between about 1.2:1 to 50:1. $R_1$ and $R_2$ may be identical or different and may be alkylene radicals-linear or branched or cyclic, heterocyclic radicals, phenylene or polycyclic aromatic radicals.

These various radicals, as well as the hydrogen-bearing carbon atoms in the maleimide ring, may carry substituents that do not give side reactions under use conditions. The preferred monomers for use in the present invention are those in which $R_1$ and $R_2$ are aromatic in nature. Usable species of the resins just described are listed in U.S. Pat. No. 3,562,223 and French Pat. No. 1,455,514.

The resins can be prepared by heating the momomer or monomers until maleimide-terminated prepolymers are obtained [equations (1) and (2)], said prepolymers then being capable of undergoing cure in situ simply by heating them at a temperature within the range of about 450° to 510° K. to form dense, insoluble, nonmelting polymer networks.

FABRICATION OF COMPOSITE STRUCTURES

The advantages of the present invention can be achieved by preparing panels in the manner that will now be illustrated, using the resins already described. For convenience, a panel having dimensions of 30 cm×30 cm×2.5 cm will be constructed. It must be understood however that those skilled in the art can vary greatly the panel sizes and configurations, as well as the fabrication techniques, without departing from the spirit of the invention.

PREIMPREGNATION OF FACE SHEET MATERIAL

A resin powder consisting essentially of N,N'-(4,4'-diphenylmethane)-bismalimide is sifted into an equal weight of n-methyl-2-pyrrolidone under vigorous agitation to prevent lumping. The viscosity of the resulting 50% by weight solution is less than 10 poises at room temperature initially and increases rapidly on aging. For best results, this resin preimpregnation solution is prepared immediately prior to use since its maximum useful life is about 20 days.

The process used to impregnate the resin solution into the glass cloth consists in passing a dried fiberglass cloth through a preferably 50% by weight solution of the bismaleimide resin. The wet cloth is then led between a steel roller and a wiper blade to assist impregnation and remove excess resin. Uniform impregnation of the glass fabric is achieved by pulling the cloth through the resin solution at a constant speed of 0.6 meters per minute, with a constant wiper blade pressure exerted on the impregnated cloth. The prepregged cloth is then dried and partly cured by heating it in an oven for 15 minutes at 355° K. and then for 30 minutes at 366° K. Prepegged cloth prepared in this manner has an average resin content of 41.3% and an average volatile content of 5.2%.

The prepegged sheet may then be cured by using either an autoclave vacuum bag technique or by the platen pressure method, both of which being well known to those skilled in the art. In the autoclave vacuum bag technique, a 33 cm×33 cm prepregged single layer cloth is sandwiched between porous Teflon-coated glass fabric sheets and is placed on a 0.6 thick aluminum plate. A glass bleeder cloth is placed against the sandwiched prepeg. The assembly is then vacuum bagged and cured at an external pressure of about 345 kN/m² at a temperature of about 450° K. for one hour. In the press method, a 33 cm×33 cm prepegged sheet is sandwiched between porous Teflon-coated glass fabric sheets and cured between 0.6 cm thick aluminum plates treated with a mold release agent. The prepeg is cured at about 345 kN/m² for one hour at about 450° K.

After curing, the face sheets are evaluated for visual defects including flaws, voids, thickness uniformity, and for resin content. The sheets are generally about 0.025 cm in thickness and contain 30% to 34% of the resin dry basis. The resin face sheets may thereafter be bonded with a polyamide adhesive to a honeycomb core filled with carbon microballoons, to provide a sandwiched structure panel assembly in the manner hereinafter described.

Core Fabrication Process

The core structure is fabricated by introducing carbon microballoons into a suitable fiberglass-bismaleimide honeycomb core and securing the microballoons by means of a bismaleimide adhesive. The core may consist of either an aromatic polyamide paper honeycomb with 0.3 cm diameter cells (Nomex HRH-10), or preferably a bismaleimide-glass fabric honeycomb, with 0.935 cm diameter cells (Kerimid 601).

The carbon microballoons are prepared by pyrolizing phenolic microballoons in a large stainless steel container which has been purged with nitrogen to contain an oxygen-free atmosphere. Typical phenolic microballoons that can be used for this purpose are described in various patents. The specific phenolic microballoons pyrolized in the present instance had the following specifications:

| | |
|---|---|
| Bulk density | 0.10–0.12 g/cc |
| True density | 0.322–0.334 g/cc |
| Particle size | <20 mesh, 90% 50–100 mesh |
| Broken balloons | <3% |
| Volatiles | 8.0% maximum |

The pyrolysis of the phenolic microballoons is preferably accomplished by placing the stainless steel container in a furnace and then cycling from room temperature to about 1089° K. in four hours, holding at that temperature for four hours, and thereafter cooling to room temperature over a period of two days. The resulting carbon microballoons are preferably cooled to at least 311° K. or lower, before removal of the nitrogen atmosphere, to prevent spontaneous ignition. The carbon microballoons, after pyrolysis, are generally agglomerated in the form of large cakes which require separation. Separation may be accomplished by placing the microballoon cakes in a container with isopropanol present in the ratio of one kilogram of carbon microballoons per seven liters of the liquid. The mixture is then vigorously shaken for 15 minutes, as in a paint shaker, with the resulting slurry being passed through a 20-mesh screen to remove any non-separated agglomerates. The screened isopropanol-carbon microballoon slurry can be used directly for core impregnation to provide a core to which the face sheet may be attached.

Impregnation may be conveniently achieved through various processes known to those skilled in the art, including vacuum screen processes in which the carbon microballoon-isopropanol slurry is drawn by vacuum into the honeycomb core. In some applications, a partially filled honeycomb core may be advantageous to provide the space necessary for expansion of the carbon microballoons during rapid temperature changes.

The filled honeycomb core is then sandwiched between two nylon fine mesh screens and two aluminum support honeycombs, and dried for about 16 hours in an air-circulating oven at about 366° K. After drying, the microballoon-filled core is saturaged with a 2% n-methyl-2-pyrrolidone solution of the bismaleimide resin used earlier for impregnation of the facing sheet. In the case of cores partially filled with carbon microballoons, the solution is sprayed into the cores at low air pressure. With cores that are completely filled with microballoons, on the other hand, the microballoons have a tendency to blow out during spraying and, therefore, the application of the 2% solution is most effectively achieved by brushing the bismaleimide resin solution over the cells. After saturation of the microballoon filled core with the 2% bismaleimide resin solution, the honeycomb is heated for about 2 hours at about 366° K. and then for about 1 hour at about 477° K., to completely cure the bismaleimide binder.

Prior to final assembly, the carbon microballoon-filled honeycomb core is examined for uniformity of microballoon fill and tested for the combined weight of the microballoons and the bismaleimide resin binder. The microballoon-resin combination should contain approximately 4 to 10% of the resin by weight of the combination, and for a half filled 2.4 cm thick core, the fill weight should approximate $145g/10^3 cm^2$.

SANDWICH STRUCTURE PANEL ASSEMBLY

The assembly of a panel in accordance with the invention is achieved by bonding the face sheet or sheets to the microballoon filled fiberglass bismaleimide honeycomb panel with a bismaleimide hot melt adhesive which again consists of the monomer used in the face sheets and the core. Prior to bonding, the face sheets and the carbon microballoon filled core are cleaned to enhance adhesion. Loose microspheres are removed from the bonding faces with a methyl ethyl ketone-soaked cleaning cloth. Each face sheet is then bonded to the core with the bismaleimide adhesive. The assembly is then placed in a platen press at about 477° K. and cured for about two hours under a pressure of about 700 $kN/m^2$. After cure, the panel is postcured for about 24 hours at about 527° K., to remove volatile materials and achieve minimal smoke characteristics.

Panels prepared in accordance with the invention exhibit excellent thermal, fire-resistant and mechanical properties, making them particularly suited for various high temperature applications and where fire safety is a primary consideration. In particular, the panels of the invention may be utilized as aircraft interior panels as well as for walls for aircraft compartments where the maximum in fire-containment and the smallest production of smoke and toxic products is desired.

Additional applications include light weight composite structural walls for lightweight ships and other transportation vehicles where light weight and fire resistance are needed. The invention may also be used as interior wall panels in space shuttle vehicles to provide maximum of fire protection and least smoke and toxic pyrolysis product generation.

The present invention will be further illustrated by way of the following specific examples which are not intended to limit the scope of applicability of the invention. In this application, parts and percentages are by weight unless expressly stated to be otherwise.

EXAMPLE 1 — Comparison with the Prior Art

Low density carbon microballoon-composites made in accordance with the detailed description of the invention above, each having a density of 132.593 $kg/m^3$, were prepared, and are compared with a representative prior art composite structure in Table 1.

EXAMPLE 2 — Thermogravimetric Analytical Comparison with the Prior Art

Two composites, identified in Table 2 below as Sample Number 1 and Sample Number 2 respectively, and similar to those described in column 2 of Table 1, but having a density of 110 $kg/m^3$, were also prepared, following generally the process described in the above detailed description of the invention. These composites were subjected to thermogravimetric analysis. The analyses were made on a DuPont 950 Thermogravimetric Analyzer using both nitrogen and air atmospheres with a sample size 10 mg. The thermogravimetric analysis data, at a 10° C./min. heating rate in nitrogen and in air, are shown in Table 2. As the data demonstrates, the composite systems of the present invention are more generally stable thermally than those of the prior art.

TABLE 1

| Composite Components (In order of lamination) | 1 (Present Invention) | 2 (Present Invention) | 3 (Prior Art) |
| --- | --- | --- | --- |
| Decorative Surface Thickness (cm) | 0.002 PVF Acrylic Ink 0.005 PVF | None | 0.002 PVF Acrylic Ink 0.005 PVF |
| Face Sheet Resin/Fabric | Bismaleimide/181 E-Glass | Bismaleimide/181 E-Glass | Epoxy Resin/181 E-Glass |
| Bond Sheet Resin/Fabric | Bismaleimide Hot Melt Adhesive | Bismaleimide Melt Adhesive | Epoxy/120 Glass |
| Core Type Thickness, (cm) | Aromatic Polyamide Paper Honeycomb | Bismaleimide Glass Honeycomb | Aromatic Polyamide-Paper Honeycomb |
| Cell size, (cm) | 2.54 | 2.54 | 2.54 |
| Density | | | |
| Core Filler % of fill | Bismaleimide-Carbon Microballoon, Syntactic Foam, 50 | Bismaleimide-Carbon Microballoon Syntactic Foam, 50 | None |
| Bond Sheet Resin/Fabric | Bismaleimide Hot Melt Adhesive/ Glass Fabric | Bismaleimide Hot Melt Adhesive/ Glass Fabric | Epoxy Resin/120 Glass Fabric |
| Face Sheet Resin/Fabric | Bismaleimide/181 E-Glass Fabric | Bismaleimide/181 E-Glass Fabric | Epoxy Resin/181 E-Glass Fabric |
| Decorative Surface Thickness (cm) | None | None | 0.005 PVF Acrylic Ink 0.002 PVF |
| Total Panel Weight in $Kg/M^3$ for 2.54 cm | 132.593 | 132.593 | 95.000 |

TABLE 1-continued

| Composite Components (In order of lamination) | COMPOSITE NUMBER | | |
|---|---|---|---|
| | 1 (Present Invention) | 2 (Present Invention) | 3 (Prior Art) |
| Thick Panels | | | |

TABLE 2

THERMOGRAVIMETRIC ANALYSIS OF COMPOSITES IN NITROGEN (HEATING RATE 10° K./min.)

| Composite Type | Percent Weight Remaining at Various Temperatures °K. (Nitrogen) | | | | | | | | |
|---|---|---|---|---|---|---|---|---|---|
| | 373° K. | 473° K. | 573° K. | 673° K. | 773° K. | 873° K. | 973° K. | 1073° K. | 1173° K. |
| State of the art | 98 | 97.8 | 96.5 | 89.5 | 77.5 | 64 | 51 | 41 | 34 |
| Sample Number 1 | 98 | 97.5 | 97 | 96 | 91.5 | 82.2 | 73.5 | 68.5 | 65 |
| | Same Conditions as above (AIR) | | | | | | | | |
| State of the art | 98.5 | 98 | 92.5 | 88 | 80.3 | 66.2 | 45 | 32.4 | 31.5 |
| Sample Number 2 | 96.5 | 96 | 95.7 | 94 | 86 | 53 | 25 | 25 | 24.5 |

EXAMPLE 3 — Comparative Test Data

A bismaleimide-carbon microballoon composite was prepared in accordance with the procedure given in the detailed description of the invention above. The composite was similar to composite No. 2 in Table No. 1, above, and had a density of 113 kg/m$^3$. The following series of tests were run to compare said composite structure of the present invention with those of the prior art.

Heat Transmission Test

In this test, a test fixture was employed that is known as the Ames 3-T facility. This fixture is essentially an oil burner burning JP-4 jet fuel in a fire brick lined combustion chamber at a rate of about 1-½ gallons per hour. The combustion chamber has various openings so that samples can be tested at a desired heating rate. The heating rate selected was 10.4–10.9w/cm$^2$, and the test consisted of placing a sample of the composite over an opening in the combustion chamber. A temperature sensing device was placed over the backing plate so that the time required for the back face to reach a selected temperature could be measured.

The results of the experiment are set forth in Table 3 below.

TABLE 3

Heat Transmission Comparison

| Sample | Material | Thickness (cm) | Density Kg/m$^3$ | Time to Reach: 373° K. (sec.) | 473° K. (sec.) |
|---|---|---|---|---|---|
| 3-1 | Prior Art | 2.54 | 95 | 80 | 140 |
| 3-2 | Present Invention | 2.54 | 113 | 300 | 465 |

It can be appreciated from Table 3 above that in the case of Sample 1, which is typical of the prior art composites, the sample reached 373° K. in 80 seconds, whereas Sample 2, prepared in accordance with the present invention, required 300 seconds to reach the same temperature.

Pyrolysis Test

A low density bismaleimide-carbon microballoon composite, similar to Composite No. 2 in Table 1, was ground to a fine particle size. The particles (Sample No. 3-3) were subjected to pyrolysis in a vacuum at about 973° K. for about 5 minutes. The major volatile products obtained are shown in Table 4 below, as determined at 296° K.

TABLE 4

| Volatile Products from Pyrolysis at 973° K. | | |
|---|---|---|
| Sample No. | Compound | Quantity |
| 3-3 (present invention) | | Mg of compound per g initial sample |
| | $CO_2$ | 155.3 |
| | CO | 14.3 |
| | $CH_4$ | 1.3 |
| | HCN | 5.9 |
| | $NH_3$ | 3.6 |

This data, which accounts for about 20% of the combustion products released in the atmosphere, does not indicate any improvement of the present structure over those of the prior art.

Thermal Conductivity Test

A low density bismaleimide-carbon microballoon composite (Sample 3-4) similar to Composite No. 2 in Table 1, was tested to determine thermal conductivity (ASTM+C-177-45). The thermal conductivity of the composite, having a density of 108 kg/m$^3$, was $4.932 \times 10^{-4}$ W. cm/cm$^{2°}$ C. Due to the carbon microballoons-bismaleimide syntactic foam present in the honeycomb, the conductivity is lower than that of prior art composites, thus providing better insulation and better fire resistance than prior art structures.

Smoke Evolution Test

Another bismaleimide-carbon microballoon composite, similar to composite No. 2 in Table 1, with a density of 100 kg/m$^3$ (Sample 3-5) was subjected to a series of tests run to compare smoke evolution from composites of the present invention with that of composites of the prior art (Sample 3-1). The NBS Smoke Chamber was utilized as described by the National Fire Protection Association, Bull. 258-T(1974), and Lee T. B., Interlaboratory Evolution of Smoke Density Chamber, National Bureau of Standards Technical Note 708 (Dec. 1971).

Smoke measurements are expressed in terms of specific optical density, $D_s$, which represents the optical density measured over a unit path length within a chamber of unit volume produced from a specimen of unit surface area.

In the standard procedure for conducting a test with the NBS chamber, the percent light transmission, T, is determined as a function of time until the minimum value is attained. The data is then converted to the specific optical density, $D_s$, where $$D_s = \frac{V}{AL}[\log_{10}(100/T)]$$

The chamber volume, V, is 0.509 m³; the light path length, L, is 0.914 m; and the exposed material surface area, A, is 0.004236 m². The maximum value of $D_s$ reached in the chamber is termed $D_m$. The tests were conducted with a heat source which gave a heat flux of 2.5 w/cm² under flaming conditions. The results obtained are reported in Table 5 below:

TABLE 5

| Smoke Evolution as Measured by Light Transmission | | | |
|---|---|---|---|
| Sample | Material | $D_s$ in 1.5 min. | $D_s$ in 4.0 min. | $D_m$ |
| 3-1 | Prior Art | 53.0 | 58.1 | 58.7 |
| 3-5 | Present Invention | 1.0 | 4.9 | 18.2 |

It can be seen from Table 5 that Sample 3-1, representing the prior art, generated the higher specific optical density value, indicating much more smoke produced. This fact could obscure vision much faster in a fire situation than composites made in accordance with the invention (Sample 3-5). Furthermore, the greater toxicity of the prior art composites, as determined by the next test, is most probably due to this phenomenon, rather than to the quantity and nature of toxic gases emitted.

Toxicity Test

A bismaleimide-carbon microballoon composite, similar to composte No. 2 of Table 1, having a density of 120 kg/m³ (Sample 3-6) was tested to provide a comparison of the relative toxicity of the pyrolysis or thermal degradation products of said composite, with those of specimens of the prior art. Samples of 1.0 g size of each were powdered, then pyrolyzed in a series of tests in a quartz tube, to an upper temperature limit of about 700° C. The effluents of each were conveyed by natural thermal flow into a 4.2 liter hemispherical chamber containing four Swiss albino male mice. The apparatus and procedure used was similar to the one described by C. J. Hilado, "Evaluation of the NASA Animal Exposure Chamber as a Potential Chamber for Fire Toxicity Screening Test," J. Combustion Toxicology, Vol. 2, No. 4, 298–314 (November 1975).

The test was conducted for 30 minutes, unless terminated earlier upon the death of all four animals. Table 6 below reports the relative toxicity to mice of the degradation products from the powdered composites upon heating.

TABLE 6

| Relative Toxicity of Pyrolysis Products | | | |
|---|---|---|---|
| Sample | Material | Time to Incapacitation of Mice (minutes) | Time to Death of Mice (minutes) |
| 3-1 | Prior Art | 18.5 | 27.5±1.9 |
| 3-6 | Present Invention | No incapacitation | No deaths |

It is apparent that the composite structures of the present invention produce less toxic fumes than prior art composite structures.

Mechanical Properties Test

Two types of bismaleimide-carbon microballoon composites were prepared having properties similar to composites No. 1 and No. 2 of Table 1, each having a density of 132 kg/m³. Tests were conducted to compare the mechanical properties of the novel composites with the composites of the prior art. The test results are reported in Table 7 below.

As the results indicate, it is now possible to prepare composites, according to this invention, that have greater flexural strength both in the long beam and short beam configurations than those of the prior art. Similarly, improved flatwise tensile strength and compressive strength may be achieved. These improvements in mechanical properties are attributed to the bismaleimide resin adhesive.

TABLE 7

| | | MECHANICAL TEST DATA (as per MIL-STD-401 B) | | | | | | | | |
|---|---|---|---|---|---|---|---|---|---|---|
| | | Type of Test | | | | | | | | |
| | | Long Beam Flexure | | Short Beam Flexure | | Flatwise Tension | | Flatwise Compression Load at Failure | Core Shear | |
| Composite Number | Test Number | Load at Failure | Face Compressive | Load at Failure | Face Compressive | Load at Failure | Type of Failure | | Load at Failure | Type of Failure |
| 1 present invention | 1 | 299 | 1712 | 199 | 1515 | 15.7 | core | 12.9 | 7.0 | core |
| | 2 | 297 | 1699 | 177 | 1300 | 17.0 | core | 10.7 | 6.9 | core |
| | 3 | 295 | 1687 | 200 | 1522 | 14.7 | core | 11.7 | 7.5 | core |
| | mean | 297 | 1699 | 192 | 1446 | 15.8 | | 11.8 | 7.1 | |
| 2 present invention | 1 | 177 | 847 | 165 | 1262 | 5.5 | skin to core | 33.6 | 6.4 | skin to core |
| | 2 | 101 | 576 | 76 | 581 | 7.9 | skin to core | 32.7 | 5.5 | skin to core |
| | 3 | 190 | 1083 | 130 | 993 | 6.7 | skin to core | 38.3 | 6.6 | skin to core |
| | mean | 159 | 615 | 124 | 945 | 6.7 | | 34.9 | 6.2 | |
| 3 prior art | 1 | 180 | 942 | 123 | 942 | 7.0 | skin to core | 6.5 | 4.6 | skin to core |

Several properties of a representative prior art composite shall now be compared with those of a composite representation of the novel low density bismaleimide-carbon microballoon composites of the invention for summarization in Table 8, below. From this comparison, it becomes evident that while the composite of the invention is slightly poorer than that of the prior art in flatwise tensile strength and volatile decomposition product at high temperatures, it is as good in terms of several properties and more importantly, it excells in such crucial aspects as fire endurance, smoke production, smoke production and relative toxicity of pyrolysis products. These latter properties are of course of vital concern in any confined space applications.

the honeycomb, and in the process of making it, will readily occur to those skilled in the art, within the spirit of the invention and the scope of the appended claims.

What is claimed is:

TABLE 8

SUMMARY OF COMPOSITE PROPERTIES

| Property | Prior Art (Epoxy-aromatic polyamide) | Invention (Bismaleimide-Carbon)* |
|---|---|---|
| Bulk Density Range Kg/m$^3$ (ASTDM 1622) | 90–96 | 100–132 |
| Flatwise Tensile Strength, at 300° K. kN/m$^2$ (ASTM C-307) | 690 | 500–610 |
| Vertical Burn Test, FAA FAR 25.853 | Passes | Passes |
| Thermal Conductivity at 300° K., W. cm/cm$^{2°}$ C$_{(ASTM\ C\text{-}177\text{-}45)}$ | $1.296 \times 10^{-3} - 1.44 \times 10^{-3}$ | $4.932 \times 10^{-4}$ |
| Smoke Density (NBS), Specific Optical Density Flaming Condition | $D_s\ 1.5 : -1.0$ $D_s\ 4.0\ min./58.1$ $D_s\ Max./58.7$ | 4.9 18.2 |
| Limiting Oxygen Index O$_2$remaining. 128 2 + O$_2$) (ASTM D-2863) | Epoxy-glass: 29 Aromatic Polyamide: 32 Composite: 29.6 | Bismaleimide-Glass Polyimide: 62 Carbon Microballoons/ Bismaleimide: 85 composites 58 Composite: 66.7 |
| Relative Toxicity of pyrolysis products from composite (1.0g) powdered at 40° K./min. to 973° K., 4 Swiss albino mice in 4.2 liter exposure chamber, 30 min. exposure | Time to Incapacitation: 18.5 min. Time to Death: 27.50 ± 1.86 min. | >30 min. >30 min. |
| Fire Endurance, NASA Ames T-3 Thermal Test Facility, Time to Reach Back Face Temperature of 477° K. at Front Face Heat Flux 11 × 10$^4$ W/m$^2$ | 2 min. 20 sec. | 7 min. 45 sec. |
| Major volatile products at 296° K. from the pyrolysis of composites in vacuum at 973° K. for 5 min. Mg of volatile compounds per g of initial sample | CO$_2$:85.5 CO: 6.2 CH$_4$: 9.4 HCN: 3.2 c$_6$H$_6$: 4.1 NH$_3$:— H$_2$: 1.2 | 155.3 14.3 1.3 5.9 3.6 |
| Thermal Stability at 973° K. (N$_2$, heating rate 10° K./min.) percent weight remaining. | 51.0 | 53.5 |

*Composition of Composities.

Percent by Weight:
| | |
|---|---|
| Bismaleimide-glass laminate | 14.1 |
| Bismaleimide Adhesive | 5.1 |
| Carbon microballoons with 2% bismaleimide | 50.5 |
| Bismaleimide-glass laminate | 30.3 |

The composities that were representative of the invention, and evaluated, were similar in structure to composite No. 2, Table 1.

The invention may be modified for particular applications to include various honeycomb core configurations and by modifying the size of the carbon microballoons and the concentration of the bismaleimide solutions employed. Composite structures having densities of from about 95 kg/m$^3$ to about 132 kg/m$^3$ or more, and with thicknesses in the range from 0.4 cm to 2.5 cm, are readily produced. While the preferred core structure is a honeycomb having hexogonal cells, any open-pored core structure, that can be filled with the carbon microballoons, can be employed in practicing the invention. It will also be appreciated that the bonding of the core to the face sheet may be accomplished by a variety of techniques.

It therefore will be appreciated that the present invention can be implemented in a variety of ways by those skilled in the art to suit particular requirements which are within the scope of the invention. While the invention has been disclosed herein by reference to the details of preferred embodiments, it is to be understood that such disclosure is intended in an illustrative, rather than a limiting sense, as it is contemplated that various modifications in the construction and arrangement of 1. A process for preparing composite structures comprising:
   a. impregnating a ceramic fiber cloth with a bismaleimide resin;
   b. curing the resin-impregnated cloth to produce a cover sheet;
   c. filling a polyamide paper or a bismaleimide-glass fabric honeycomb core structure with carbon microballoons; and
   d. bonding said cover sheet to said honeycomb core structure with a bismaleimide hot melt adhesive.

2. A process in accordance with claim 1 wherein the impregnation is carried out with a solution of bismaleimide resin powder in an n-methyl-1-pyrrolidone solvent.

3. A process in accordance with claim 2 wherein said resin impregnation is accomplished by passing the cloth through a bismaleimide solution and then through a roller and wiper to assist resin impregnation.

4. A process in accordance with claim 1 additionally comprising drying said resin impregnated cloth before curing by heating for 15 minutes at 355° K.

5. A process in accordance with claim 1 wherein said curing is accomplished by a vacuum bag technique wherein said resin impregnated cloth is cured at an external pressure of about 345 $kN/m^2$ at about 450° K. for about 1 hour.

6. A process in accordance with claim 1 wherein said curing is accomplished by press curing between plates treated with a mold release agent at about 345 $kN/m^2$ at about 450° K. for about 1 hour.

7. A process for preparing composite honeycomb structures in accordance with claim 1 wherein:
   a. the impregnating step comprises impregnating a glass fiber cloth with a bismaleimide resin and then curing the impregnated cloth, to produce a cover sheet containing from about 30% to about 34% of the cured resin by weight;
   b. the filling step comprises filling a polyamide paper or bismaleimide-glass fiber cloth honeycomb core structure with carbon microballoons; and
   c. there is an added step of coating the microballoons in situ in the core with a bismaleimide resin in sufficient quantity to bond the microballoons to each other and to the core upon curing the resin, and curing the resin.

8. A process in accordance with claim 1 further comprising preparing the microballoons by pyrolyzing phenolic microballoons in the presence of nitrogen.

9. A process in accordance with claim 1 wherein said honeycomb core is filled by vacuum screening an isopropanol-carbon microballoon slurry into said honeycomb core.

10. A process in accordance with claim 1 further comprising soaking the microballoon-filled core with a bismaleimide resin solution.

11. A process in accordance with claim 10 comprising soaking the microballoons with a 2 percent by weight bismaleimide resin solution in n-methyl-1-pyrrolidone.

12. A process in accordance with claim 10 further comprising curing said microballoon-filled core by heating for about 2 hours at about 366° K. and for about 1 hour at about 477° K.

13. A process in accordance with claim 10 wherein said bonding is achieved in a press operated at about 477° K. and cured for about 2 hours at about 700 $kN/m^3$.

14. A process in accordance with claim 1 further comprising a postcure for about 24 hours at about 477° K. to remove volatiles and to achieve minimal smoke characteristics.

* * * * *